… … …

United States Patent Office 3,790,520
Patented Feb. 5, 1974

3,790,520
ACRYLATE POLYMER LATEX COMPOSITIONS WITH ALIPHATIC GLYCOLS AND/OR ALIPHATIC GLYCOL ETHERS
Robert Ludwig, Lorain, Ohio, assignor to The B. F. Goodrich Company, New York, N.Y.
No Drawing. Continuation of abandoned application Ser. No. 24,795, Apr. 1, 1970. This application May 3, 1972, Ser. No. 250,081
Int. Cl. C08f 45/24, 45/26
U.S. Cl. 260—29.6 E  9 Claims

ABSTRACT OF THE DISCLOSURE

Latices containing alkyl acrylate and alkyl methacrylate copolymers of more than 40% of said alkyl acrylate and/or alkyl methacrylate ester, having a homopolymer glass temperature in the range of less than 10° C., and about 15 to 55% of a vinylidene monomer copolymerizable therewith having a terminal $CH_2<$ group, the homopolymer of said vinylidene comonomer having a glass temperature greater than about 20° C., and greater than 10 parts per 100 parts of copolymer of an aliphatic glycol and/or glycol ether, provide clear, weather-resistant films deposited from the latex and are useful in improving the physical properties of paper and in adhering fabrics.

This is a continuation of application Ser. No. 24,795, filed Apr. 1, 1970 now abandoned.

BACKGROUND OF THE INVENTION

Because of their film-forming properties and resistance to deterioration on aging, lactices of alkyl acrylate polymers have been of interest in pigmented interior and exterior protective coating applications. Use in such applications, as clear finishes for protecting wood surfaces has been limited because difficulty has been experienced in obtaining the proper balance of surface and aging characteristics. The acrylate film must be soft enough to form a continuous adherent film, but if too soft the surface may be tacky and dirt pick-up is a problem. Other problems include poor film aging and no protection of the wood surface, water sensitivity of the film and poor resistance to ultra-violet. If acrylate copolymers containing hardening monomers are used, if enough hardening monomer is employed to eliminate tack, reduce dirt pick-up and improve durability the resulting polymer films often may not adhere satisfactorily to the wood surface and may not form continuous age resistant films so that cracking and peeling is a problem.

It was found that copolymers of an alkyl acrylate containing more than 40% of a lower alkyl acrylate and about 25 to 50% of a comonomer including alkyl alkacrylate as unsaturated methyl methacrylate, methyl ethacrylate and butyl methacrylate; nitriles as acrylonitrile or methacrylonitrile and a vinyl halide as vinyl chloride or vinylidene chloride, provided the necessary film characteristics so that a clear film could be deposited from a latex containing this copolymer onto a surface in a continuous film with adequate adhesion. However, it was found that with such films water spotting was a problem even after the film was dry and now obtained whitening effects where water contacted the film. Further, improved resistance to aging caused by atmospheric effects was also desired, along with improved surface appearance of the film.

SUMMARY OF THE INVENTION

Latices of alkyl acrylate and/or methacrylate copolymers of greater than 40% of an alkyl acrylate or methacrylate, having a homopolymer glass temperature less than about 10° C., and greater than 15 to less than 55% of a hardening vinylidene monomer such as alkyl methacrylate, an acrylonitrile, a vinyl halide, the homopolymer thereof having a glass temperature greater than about 20° C. and containing greater than 10 to about 100 parts per 100 parts of copolymer of an aliphatic glycol containing 2 to 6 carbon atoms and/or an aliphatic glycol ether containing 4 to 8 carbon atoms provide improved protective films when deposited from the latex. Such films have a useful combination and balance of film-forming properties, adhesive properties, surface appearance, resistance to dirt pick-up, resistance to water spotting and blushing and improved resistance to atmospheric aging. These latices also provide paper having improved physical properties when paper is impregnated therewith, and improved adhesion of fabric layers, as compared to latices not containing the aliphatic glycols and/or ethers.

DETAILED DESCRIPTION

The useful lower alkyl acrylates and elastomer-forming alkyl methacrylates include those having homopolymer glass temperatures in the range of less than about 10° C. Useful monomers include methyl acrylate, ethyl acrylate, propyl acrylate, butyl acrylate, 2-ethylhexyl acrylate, lauryl methacrylate, octyl methacrylate, hexyl methacrylate, β-cyanoethyl acrylate and the like. Such alkyl acrylates are normally esters of acrylic acid wherein the alkyl groups contain 1 to 8 carbon atoms and the alkyl methacrylates are esters of methacrylic acid wherein the alkyl group contains more than 4 carbon atoms. Mixtures of these monomers may be used.

The other essential monomers present in the copolymer in amount from greater than 15 to less than 55%, more preferably from about 20 to 50%, include vinylidene monomers having a terminal $CH_2<$ group, that as homopolymers have glass temperatures greater than about 20° C. including, for example, methyl methacrylate, propyl methacrylate, cyclohexyl methacrylate, ethyl methacrylate, acrylonitrile, methacrylonitrile, the vinyl halides including vinyl chloride and vinylidene chloride, vinyl acetate, styrene and like vinylidene monomers having the defined glass temperatures.

The temperature at which a polymer changes from a rubbery solid to a brittle substances (the "glass" state), i.e., when it will not tolerate appreciable deformation without fracture, is usually referred to as the "second-order transition temperature" or "glass temperature," and generally is designated by the symbol $T_g$. Details on measuring the second-order transition temperature of polymers and the ramifications of this value are given in the books "Principles of Polymer Chemistry," Paul J. Flory, Cornell University Press, Ithaca, N.Y., 1953, pp. 52–53 and 56–57, and in "Monomeric Acrylic Esters," E. H. Riddle, Reinhold Publishing Corp., New York, N.Y., 1954, pp. 59–60. Listed below are the glass temperatures of some typical acrylate and methacrylate ester homopolymers.

| Polymer: | $T_g$, ° C. |
|---|---|
| Poly(lauryl methacrylate) | −65 |
| Poly(2-ethylhexyl acrylate) | −55 |
| Poly(butyl acrylate) | −52 |
| Poly(ethyl acrylate) | −22 |
| Poly(octyl methacrylate) | −20 |
| Poly(hexyl methacrylate) | −5 |
| Poly(β-cyano ethyl acrylate) | 6 |
| Poly(methyl acrylate) | 3–9 |

Listed below are the glass temperatures of some typical vinylidene monomers copolymerizable with the acrylate and methacrylate esters as a second essential comonomer for the copolymers of the latices of this invention.

Polymer: $T_g$, °C.
- Poly(butyl methacrylate) — 20
- Poly(vinyl acetate) — 29
- Poly(propyl methacrylate) — 35
- Poly(cyclohexyl methacrylate) — 58
- Poly(ethyl methacrylate) — 65
- Poly(vinyl chloride) — 82
- Poly(acrylonitrile) — 97
- Poly(styrene) — 100
- Poly(methyl methacrylate) — 105

Excellent results are obtained with latices of copolymers also containing less than 10% of reactive monomers for example, acrylamide and methacrylamide, t-butyl acrylamide, diacetone acrylamide, N-alkylol amides as N-methylol acrylamide and N-methylol methacrylamide, N-alkoxyalkyl acrylamides including for example, N-ethoxymethylacrylamide and N-butoxymethylmethacrylamide, and α,β-unsaturated carboxylic acids containing 3 to 6 carbon atoms including for example, acrylic acid and methacrylic acid and dicarboxylic acids as itaconic. At least about 0.2% of these monomers may be used to as much as about 20%. Useful are copolymers containing about one part each of at least two such monomers; for example, N-butoxymethyl acrylamide and acrylamide; N-methylol acrylamide and acrylamide; N-methylol acrylamide and acrylic acid and the like, the total of such comonomers being less than 10% of the copolymer and more preferably less than 5%.

The type of aliphatic glycol and glycol ether is critical in order to obtain the advantages of this invention. The aliphatic glycols must contain between 2 and 6 carbon atoms including for example, ethylene glycol, 1,2-propylene glycol, 1,3-propylene glycol, 1,4-butanediol, 1,4-butenediol, 1,6-hexanediol, diethylene glycol and the like. It was found quite unexpectedly that 1,2,6-hexanetriol and glycerine were not satisfactory in accordance with this invention, providing in the case of latex deposited films on wood, water blush, water spotting and very poor drying characteristics.

The aliphatic glycol ethers found useful in the practice of this invention contain 4 to 8 carbon atoms and, preferably monoethers for clear varnish application, for example, ethylene glycol monoethylether, ethylene glycol monobutylether, diethyleneglycol monomethylether, diethyleneglycol monobutylether and the like.

The amount of aliphatic glycol and glycol ether required to obtain the advantages of this invention in conjunction with the defined polymers must be greater than 10 parts per 100 parts of copolymer in the latex to about 100 or more parts. Larger amounts add to the cost. Better results are obtained when there are at least 20 parts of glycol or glycol ether to about 60 parts in order to obtain the desired appearance and the performance of the protective film. Even better results are obtained when a mixture of glycol and glycol ether are employed for example, 50 parts of propylene glycol and 40 parts of ethylene glycol monobutylether. When mixtures are used, the total will be about 20 parts to about 100 parts with at least about 5 parts of a glycol or glycol ether. The glycol or glycol ether being water soluble are merely stirred into the latex as desired. The glycol or glycol ether may also be present in the polymerization mixture.

The latices of this invention are readily prepared by methods employed by those skilled in the art in providing alkyl acrylate polymers in aqueous dispersions. The polymerizations may be conducted in batch reactions or continuously and the monomers may be proportioned to a reactor containing water and known polymerization additives. The polymerizations may be conducted over a wide range as from −10° C. to 95° C. While heat and ultraviolet light may be used to initiate the polymerization of monomers, better results are generally obtained by polymerization with a free radical generating catalyst in the presence of surface active agents.

The catalyst employed may be any of those free radicals forming and other catalysts known to those skilled in the art including both organic and inorganic peroxides, inorganic persulfates, organic hydroperoxides, azo compounds, the well known redox catalysts, and reduced metal catalysts. Other additives will include acid or base to adjust the pH of the aqueous dispersion which usually will be in the range of about 4 to 8; buffers, inorganic salts and surface active agents.

Some of the alkyl acrylates have sufficient solubility in water for polymerization purposes so that only minimum amounts of surface active agents are normally required to form the copolymer latices. Typical surface active agents found useful in preparing the copolymer latices include sodium alkyl sulfates as sodium lauryl sulfate, sodium alkylaryl sulfates, nonionics such as alkyl, phenoxy, polyethoxy, ethanol, sodium naphthalene sulfonate, quaternary salts, polyglycol fatty acid esters and the like. The latices may be prepared to contain concentrations of copolymers from as low as 1% to as high as about 65% or more in aqueous dispersion but for economical reasons the concentration of copolymer in the latex normally will be greater than about 25%, as 35% to 60%.

The primary advantage of films prepared by depositing the latex of this composition are clear. Age resistant films are obtained from latices containing the defined copolymers and glycols. While large amounts of pigments such as titanium dioxide; zinc oxide; red, brown, yellow and orange iron oxides and green chrome oxides could be combined with the latex to make a typical paint, the real advantage of the latex compositions are in their use to produce clear varnishes having advantages not hitherto available in clear varnishes and finishes. Small amounts of tinting pigments as iron oxide, organic dyes and the like may be used in amounts preferably less than about 5 parts per 100 of copolymer. Small amounts of other additives including mica, silica, talc and clay may be included to obtain specific surface and appearance effects. Dispersing the wetting agents may be found to be necessary for specific applications. Small amounts of antifoamers in amounts less than about 1% of types well known, including the silicones may also be included. Fungicides and mildewcides such as oil-soluble phenyl mercury salts and water-soluble pentachlorophenates in amounts of about 0.5 to 1% may also be included. Thickeners known in this art may also be included if desired. Ultraviolet inhibitors may be included for exterior formulations. Less than 20 parts of alkyd-type resins and polymers of vinyl chloride such as paste-type resins may also be included.

In one application of a composition of this invention, a latex containing 50% of a copolymer, of 75% ethyl acrylate and 25% methyl methacrylate, and 50 weight parts of propylene glycol per 100 weight parts of copolymer is brushed onto smooth pine, cedar, and red fir panel surfaces and allowed to dry. Three coats are applied. The resulting film from the latex drys to a non-redispersible film in less than one hour, and is clear and colorless, does not water blush or spot once the surface is dry; is readily sanded to obtain a smooth surface; can be rubbed to a satin finish; has excellent abrasion resistance and excellent aging both in a weatherometer and in extended outdoor aging tests in Northern Ohio, California and Florida. Resistance to dirt pick-up is also excellent. This composition and samples prepared from this latex without the glycol and coated on wood are placed in a weatherometer. Discoloration of the fiber and breaks and cracking in the film are observed in the samples containing no glycol after 600 hours, whereas there is no discoloration or cracking or loss of gloss in the film coating from the latex containing the glycol after 1500–2000 hours. The coating containing the glycol has better gloss and dirt pick-up is readily removed with water as compared to films not containing the glycol and more resistant to household chemicals such as cleaners and food stains. The glycol-free films even after completely drying whiten when exposed to water, as compared to the films containing glycol that neither water spotted nor blushed when exposed to water after complete drying or after an initial exposure to water, even before complete drying removes surface glycol. This is quite unexpected because of the water solubility of the glycol.

Styrene is not a preferred comonomer for providing a copolymer latex for exterior coatings. A copolymer of about 75% ethyl acrylate and 25% styrene was not completely satisfactory as a protective film, particularly in its resistance to outdoor aging and loss of gloss.

This latex may be further compounded to provide better brushability and leveling and in addition a satin finish may be obtained by adding to the latex above, containing propylene glycol, 10 parts of ethylene glycol monoethylether, 2 parts of a 25% solution of ammonium polyacrylate, 0.25 part of high molecular weight poly (acrylamide), 30 parts of diethylene glycol monoethylether and 10 parts of paste grade polyvinyl chloride. This composition is satisfactory for finishing internal wooden surfaces as floors, woodwork and furniture. Another unique application for this system because of the aging properties of the polymer is binding a wood preservative treatment to surfaces such as window sashes where moisture causes excessive deterioration. If desired, a fungicide in amount of 0.5 part of a phenyl mercury salt may be used. For outside application, 1 part of an ultraviolet absorber such as 2-hydroxy-4-methoxybenzophenone may be used. Another composition useful as an abrasion resistant floor coating is prepared from 200 weight parts of the 50% solids latex described above, 50 parts of ethylene glycol, 0.5 part of ammonium polyacrylate and 0.5 part of polyacrylamide. Other useful latices include those of copolymers of 60 butyl acrylate-40 acrylonitrile, 50 butyl acrylate-50 methyl methacrylate, 80 ethyl acrylate-20 vinyl chloride, 60 ethyl acrylate-37 acrylonitrile-1 acrylic acid-2 N-methylol acrylamide, and the like.

A latex compound that is useful in protecting or removing the surface of weathered glass fiber, reinforced polyester, plastic panels subject to outdoor exposure is prepared from a 50% total solid latex of a polymer containing 62% ethyl acrylate, 35% acrylonitrile and 3% of at least one acrylamide, 1 part of 2-hydroxy-4-methoxybenzophenone, 10 parts of ethylene glycol monoethylether, 0.5 part of a phenylmercury salt fungicide, 0.75 part sodium polyacrylate, 0.25 part of poly(acrylamide), 30 parts of ethylene glycol and 25 parts of water to provide a latex compound of 36% solids. Four successive coats of latex are brushed onto the panel and after complete drying, exposure to water did not reduce the excellent adhesion of the film to the panel and no whitening from rain is observed. This composition is also found to be useful when coated on clean metal as a protective finish. Other variations include the addition of less than 25 parts of alkyd resins such as safflower oil alkyd to extend the finish and still retain good aging properties. Other applications of the novel compositions of this invention are described below.

Samples of bleached flat paper saturated with a latex containing a copolymer of 54% ethyl acrylate, 38% methyl methacrylate and 10% acrylic acid and 30 parts per 100 parts of ethylene glycol, at a total solids of 25% to provide a 70% copolymer in the dry paper, have improved wet tensile strength.

This latex, containing 25 parts of propylene glycol, is used to bond wool and nylon or acetate tricot fabrics together by coating the surfaces with a 40% solids latex, pressing together and heating at 300° F. for 3 to 5 minutes. The resulting composite has improved bond strength and fabric hand as compared to fabric bonded together with this latex not containing the propylene glycol.

I claim:

1. A latex composition comprising a copolymer consisting essentially of more than 40% of an alkyl acrylate wherein the alkyl group contains 1 to 8 carbon atoms and/or alkyl methacrylates wherein the alkyl group contains more than 4 to 12 carbon atoms and greater than 15% to less than 55% of vinylidene monomers copolymerizable therewith having a terminal $CH_2<$ group selected from the group consisting of different alkyl methacrylates, an acrylonitrile, a vinyl ester, an acrylamide and a vinyl halide, and at least about 20 to about 100 parts per 100 parts of copolymer of an aliphatic glycol containing 2 to 6 carbon atoms and/or an aliphatic glycol ether containing 4 to 8 carbon atoms.

2. A composition of claim 1 wherein the aliphatic glycol or glycol ether is present in amount of above 20 to about 60 weight parts per 100 weight parts of copolymer.

3. A composition of claim 2 wherein there is both an aliphatic glycol and glycol ether in amount from about 20 to 100 total parts with at least about 5 parts of glycol or glycol ether.

4. A composition of claim 2 wherein the alkyl group of the alkyl acrylate contains 1 to 4 carbon atoms.

5. A composition of claim 4 wherein the vinylidene monomer is methyl methacrylate.

6. A composition of claim 4 wherein the vinylidene monomer is acrylonitrile.

7. A composition of claim 1 wherein the vinylidene monomer is selected from the group consisting of methyl methacrylate, acrylonitrile and vinyl chloride and the copolymer contains less than 20% of an acrylamide, N-alkylol amide or N-alkoxyalkyl acrylamide.

8. A composition of claim 7 wherein the alkyl acrylate is ethyl acrylate and there is present a mixture of 20 to 100 parts, per 100 parts of copolymer, of propylene glycol and an ethyleneglycol monoalkylether.

9. A composition of claim 7 wherein the alkyl acrylate is ethyl acrylate, the vinylidene monomer is methyl methacrylate and there is present at least 1% of an acrylamide.

References Cited

UNITED STATES PATENTS 3,057,812  10/1962  Straughan et al. __ 260—29.6 ME
3,640,935   2/1972  Abriss _____ 260—29.6 ME LUCILLE M. PHYNES, Primary Examiner U.S. Cl. X.R.

117—139.5, 155 UA; 260—29.6 ME, TA, 33.2 R, 33.4 R, 80.73